F. A. SHATTUCK.
CULINARY VESSEL.
APPLICATION FILED MAY 18, 1916.

1,260,720.  Patented Mar. 26, 1918.

Witnesses
C. S. Wagner
D. R. Partello

Inventor
F. A. Shattuck
By Robt & Robt
Attorneys

UNITED STATES PATENT OFFICE.

FRED A. SHATTUCK, OF SHERBURNE, NEW YORK.

CULINARY VESSEL.

1,260,720.          Specification of Letters Patent.      Patented Mar. 26, 1918.

Application filed May 18, 1916. Serial No. 98,394.

*To all whom it may concern:*

Be it known that I, FRED A. SHATTUCK, a citizen of the United States, residing at Sherburne, in the county of Chenango and State of New York, have invented certain new and useful Improvements in Culinary Vessels, of which the following is a specification.

This invention relates to improvements in culinary vessels and comprehends the provision of a cooking utensil especially adapted for boiling different articles of food at one time but in separate relation to each other, the primary object in view being to provide a main boiling receptacle with an inner food holding container so arranged therein that a circulation of the liquid is obtained during the boiling operation for uniformly cooking the articles disposed in said container.

A further object is to provide a nested steaming receptacle by means of which cooking articles may be kept in heated condition by the boiling in the main receptacle above referred to.

These and such other objects as may hereinafter appear are attained by the novel construction, combination and arrangement of parts to be hereinafter specifically described and claimed. Reference will now be had to the accompanying drawings forming a part of this specification, wherein:—

Throughout the following detail description, and on the several figures of the drawings, similar parts are referred to by like reference characters.

Figure 1:
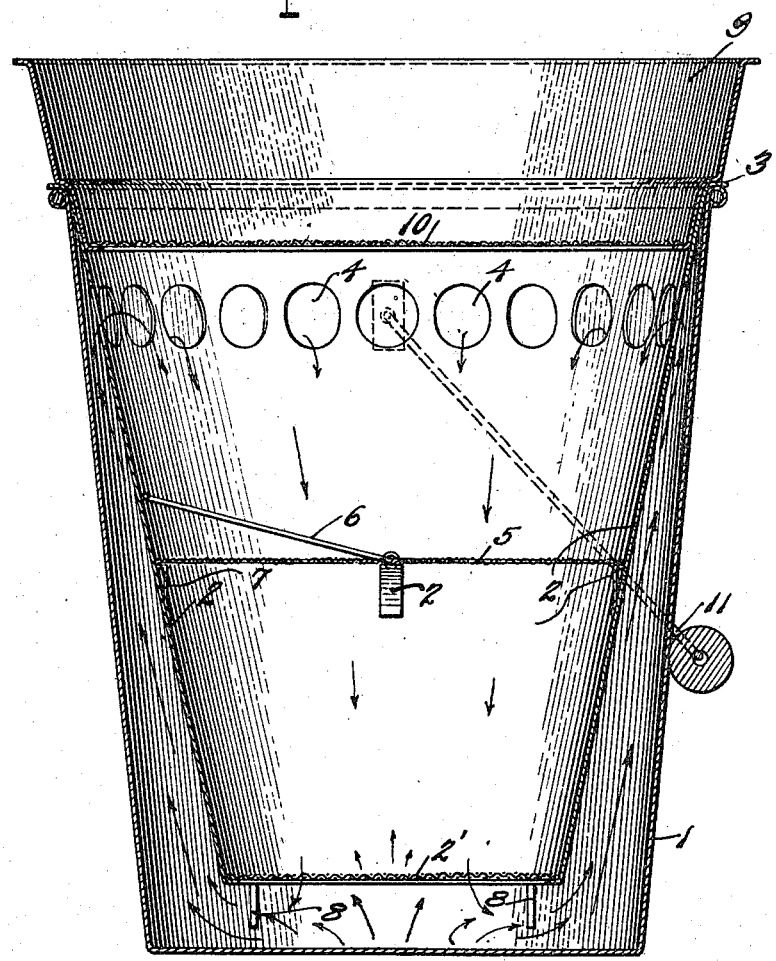
Figure 1 is a vertical sectional view through a device constructed in accordance with my invention.

The numeral 1 designates the main vessel or receptacle which is of conventional type employed for boiling purposes, said receptacle being adapted to hold water into which the inner receptacle 2 is adapted to be introduced. The member 2 is provided with a removable bottom 2' of foraminous material and is of a substantially smaller size than the vessel 1 so that the sides of the former are spaced from the latter excepting at the top where the inner receptacle is formed with an outwardly rolled rim 3 for seating upon the edge of the outer receptacle. Around the upper portion of the inner vessel 2 is formed a plurality of openings 4 and these openings insure that a circulation of the water or liquid will be afforded during the boiling action, said liquid passing upwardly between the spaced walls of the receptacles, through the openings and out at the bottom of the inner member, as indicated by the arrows in Fig. 1.

Figure 2:
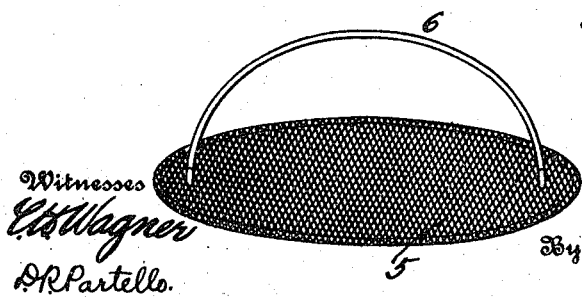
Fig. 2 is a perspective view of the partition member for dividing the food container into separate compartments.

Articles of food are to be placed in the inner container and the latter is preferably divided into two compartments, an upper and lower, separated by a removable screen member 5, shown in Fig. 2 most clearly, provided with a handle or bail 6, said screen being held in position by the brackets 7 on the inner wall of the member 2. This screen enables the disposition of different kinds of articles in the separate compartments yet each article is subjected to uniform boiling owing to the circulation hereinbefore mentioned. Boiling over of the liquid is practically precluded by reason of the provision of openings 4 and the particular shape of the inner vessel which forces the liquid to pass through the openings and this I deem a very desirable feature of my invention. The inner receptacle 2 is provided with legs 8 and it will be understood that the liquid may be drained readily from the food container merely by removing the same from the receptacle 1. If desired the bottom 2' may be displaced to remove the articles in the lower compartment without disturbing the contents of the upper compartment of the inner vessel by turning the bottom member up on its edge and in like manner the upper compartment may also be emptied without removing the contents of the lower compartment. Having in view the spacing of the inner receptacle from the outer vessel the contents of the food container cannot be burned should the water boil out of the same.

Adapted to be seated within the mouth of the container 2 is a steaming receptacle 9 which is reduced at its lower portion to enable it to extend partly into the container 2. This steaming receptacle is provided with a foraminous bottom 10 so that the heat and steam from the boiler 1 may pass upwardly through the same for the purpose of keeping articles of food disposed in this receptacle in heated condition.

As a matter of convenience the receptacle 1 is provided with a bail 11 for facilitating handling of the same.

Having thus described the invention what I claim is:—

In a cooking utensil, the combination of an outer boiling receptacle, and an inner food holding container sustained from the mouth of the outer receptacle in spaced relation to its bottom, the inner container having the material about its base flanged inwardly to provide a bottom support, a removable partition disposed centrally of the inner container dividing the same into upper and lower compartments, a bail therefor for withdrawing the partition and the contents of the upper compartment, and a removable bottom for the lower compartment disposed upon the flanged support aforesaid and displaceable inwardly of the lower compartment to permit removal of the contents of the lower compartment without disturbance of the contents of the upper compartment.

In testimony whereof I affix my signature in presence of two witnesses.

FRED A. SHATTUCK.

Witnesses:
WARD N. TRUESDELL,
DUANE L. ATKYNS.

Copies of this patent may be obtained for five cents each, by addressing the "Commissioner of Patents, Washington, D. C."